TWO-CORE-PER-BIT WAFFLE IRON MEMORY

Filed May 7, 1964

INVENTOR
J. L. SMITH
Herbert M. Shapiro
ATTORNEY

April 22, 1969 J. L. SMITH 3,440,622
TWO-CORE-PER-BIT WAFFLE IRON MEMORY
Filed May 7, 1964 Sheet 2 of 2
FIG. 3
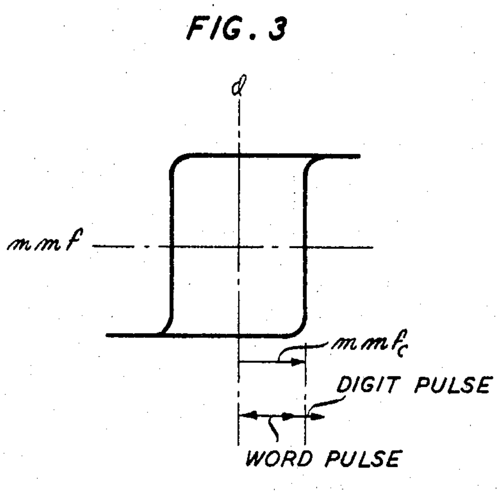
FIG. 4
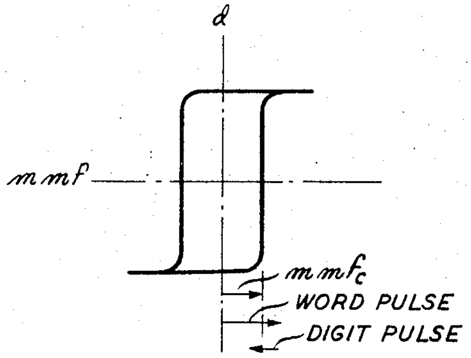
FIG. 6
| | 14 | 15 |
|---|---|---|
| "1" | → | ← |
| "0" | ← | → |
| "READ" | ← | ← |

United States Patent Office 3,440,622
Patented Apr. 22, 1969

3,440,622

TWO-CORE-PER-BIT WAFFLE IRON MEMORY

James L. Smith, Bedminster, N.J., assignor to Bell Telephone Laboratories, Incorporated, New York, N.Y., a corporation of New York Filed May 7, 1964, Ser. No. 365,589
Int. Cl. G11c *11/02;* G11b *5/64*
U.S. Cl. 340—174 5 Claims

ABSTRACT OF THE DISCLOSURE

Two-core-per-bit operation is achieved on a single polarity mode in the absence of a biasing circuit. A waffle iron arrangement having a high permeability or low reluctance base plate and posts with an overlay having rectangular hysteresis characteristics juxtaposed with the posts is adapted to this end by making different the distances between the first and second and the second and third posts of each bit.

This invention relates to magnetic memories and, more particularly, to magnetic memories employing memory planes in which information is stored in the form of first and second magnetic conditions.

One memory plane particularly useful in accordance with this invention is commonly termed a "waffle iron" memory. In this connection, a waffle iron memory plane is one which includes a relatively low reluctance base plate having posts of substantially equal dimensions thereon arranged, typically, in rows and columns, and a magnetic plate of a material having substantially rectangular hysteresis characteristics juxtaposed with the posts. One such memory is described in copending application Ser. No. 215,318, of A. H. Bobeck and J. L. Smith, filed Aug. 7, 1962, now Patent No. 3,274,571 issued Sept. 20, 1966. Such memories are conveniently operated in two-core-per-bit fashion as is also described in that copending application.

In general, two-core-per-bit operation of a magnetic memory is well known. The advantages in speed of operation, operating margins, and amplitude of output signals provided thereby are also well known. Actually, two-core-per-bit operation may be achieved in any of several modes. One of these modes requires bipolar pulses on the digit conductor coupling the two cores of each bit in a column of bits of a word-organized memory. In this manner, first and second or, alternatively, second and first magnetic states are stored in the two cores of a bit selected location by coincident pulses on word and digit conductors, depending on the polarity of the pulse on the digit conductor. This type of mode is described in the Proceedings of the IRE, January 1962, by J. A. Rajchman, in an article entitled "Computer Memories—A Survey of the State-of-the-Art," at p. 112.

Another mode of operation requires only single polarity pulses on the digit conductor storing, in the two cores of a selected bit location, the presence and absence of a first magnetic state (binary "1") in response to coincident word and digit pulses, and normally storing like magnetic states (binary "0") in both cores in response to a word pulse only. This latter mode has the advantage that it requires unipolar drive pulse sources which are less expensive than the bipolar drive pulse sources which are required for the former mode.

In accordance with this last mentioned mode of operation termed a "single polarity" mode, a word pulse, applied in the absence of a coincident digit pulse, may store a binary "1" rather than the intended binary "0" if the first core of the selected bit location has a lower switching threshold than the second and the word pulse has an amplitude sufficient to switch the first core but not the second. Such a difference in switching thresholds results because the magnetic characteristics of magnetic material can be controlled only to within tolerances of ten percent. This problem can be avoided by utilizing only high or low amplitude word pulses. This limitation, however, reduces the margin advantages of the two-core-per-bit arrangement essentially to that of a one-core-per-bit arrangement. Furthermore, if any range of word pulse amplitudes is eliminated, the memory may not be compatible with other interconnected circuitry. A method for avoiding the problem while still preserving the margin advantages of such a mode of operation is to bias all the cores of the memory so that the second core switches first in response to a word pulse. Such biasing, however, requires additional bias conductors and sources.

An object of this invention is to provide a new and novel memory of the waffle iron type operating in the single polarity mode in the absence of bias conductors and sources.

The above and further objects of this invention are realized in one embodiment thereof wherein each even-numbered column of posts of a waffle iron memory is spaced apart unequal distances from the odd-numbered columns of posts immediately adjacent to it.

Accordingly, a feature of this invention is a low reluctance base plate having a plurality of posts thereon arranged, illustratively, in rows and columns wherein each even-numbered column of posts is spaced apart from the adjacent, higher ordered, odd-numbered column of posts a distance greater than that by which it is spaced apart from the adjacent, lower ordered, odd-numbered column of posts.

The invention and its objects and features will be understood more fully from the following discussion rendered in conjunction with the accompanying drawing wherein:

FIGS. 3 and 4 are idealized hysteresis characteristics for the first and second "core" of a bit location of the memory of FIG. 1; and FIG. 6 is a chart illustrating the direction of flux in the representative bit location of FIG. 2 during operation in accordance with this invention.

Figure 1:
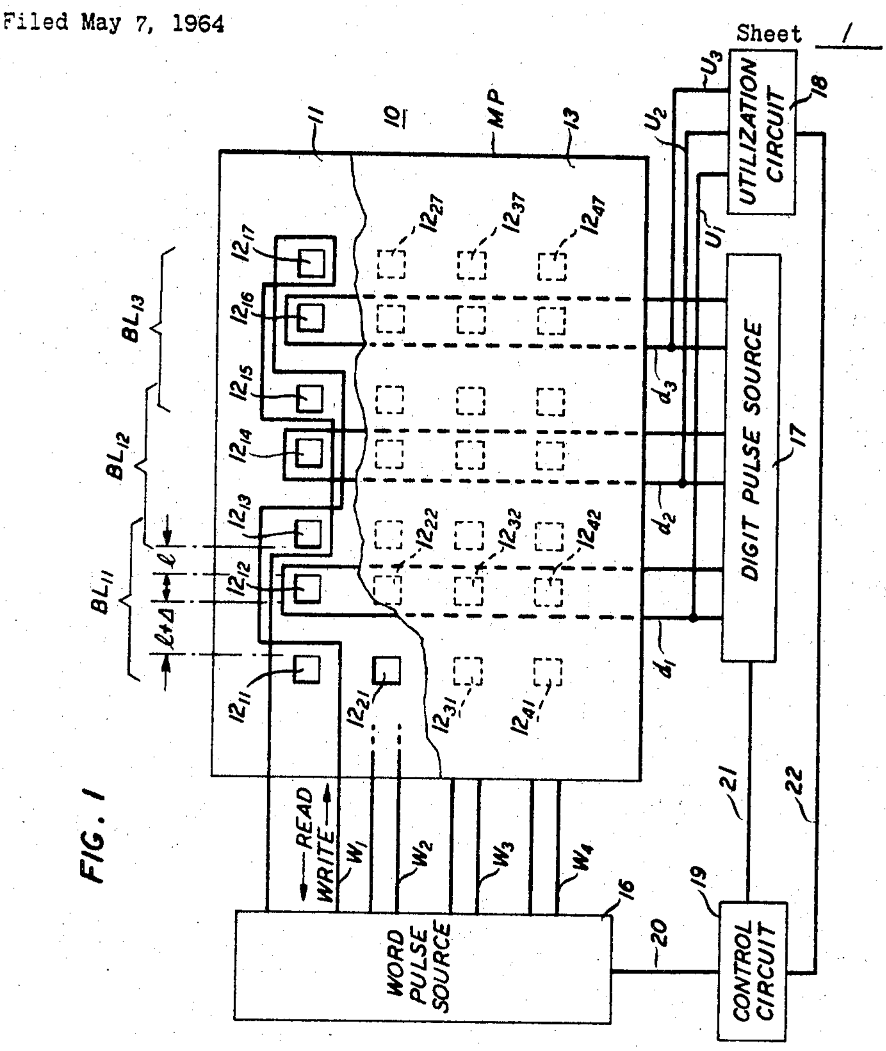
FIG. 1 is a word-organized, waffle iron memory in accordance with this invention.
Figure 2:
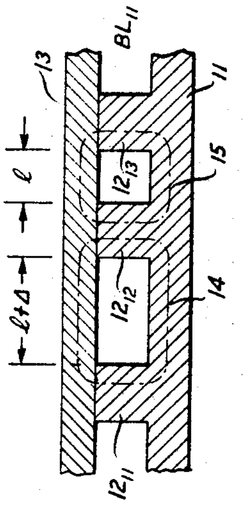
FIG. 2 is a cross section of the memory plane of FIG. 1 illustrating a representative bit location thereof.

FIG. 1 shows a word-organized waffle iron memory 10 in accordance with this invention. The memory comprises a memory plane MP including a base plate 11 having posts 12 thereon and a plate 13 of a material having substantially rectangular hysteresis characteristics overlying the posts. The construction of the memory plane is best shown in FIG. 2. The posts 12 are arranged, illustratively, in rows and columns, and each post bears subscripts corresponding to the row and column, respectively, in which it is positioned. The posts of the even-numbered columns, for example, the posts $\mathbf{12}_{12}$, $\mathbf{12}_{22}$, $\mathbf{12}_{32}$, and $\mathbf{12}_{42}$ of the second column are spaced apart from the posts of the first column a distance greater than that by which they are spaced apart from those of the third column of posts. The difference between these spacings is chosen to compensate for the expected maximum difference in magnetic characteristics of the material, that is, ten percent. Accordingly, the one separation $l$ between adjacent columns is, for example, 20 mils, the separation $l+\Delta$ between the next adjacent columns is 22 mils. This arrangement is shown in FIG. 1.

A two-core-per-bit organization of such a memory plane requires three posts, because information is stored in the plate 13 herein in the localized region between two posts; one post can be common to two adjacent bit locations. FIG. 2, then, shows the cross section of a representative bit location $BL_{11}$ of the memory of FIG. 1, indicating the separation between posts. Broken, closed curves 14 and 15 indicate flux closure paths through the bit location. Since the path 15 is shorter than the path 14 (particularly the portion thereof in plate 13), its reluctance is lower and its switching threshold is lower. This is illustrated by the idealized hysteresis characteristics of FIGS. 3 and 4 in terms of $\Phi$, the flux in Maxwells, and *mmf*, the magnetomotive force in ampere turns. FIG. 3 shows the characteristics of flux path 14; FIG. 4 shows that of flux path 15. The magnetomotive force $mmf_c$ required to reach the switching threshold of the characteristic of FIG. 4 is less than that of FIG. 3.

A plurality of conductors are threaded between the posts 12 for providing word-organized operation thereof. Accordingly, these conductors and the pulse sources to which they are connected are designated in keeping with the terminology of word-organized memories. Each of a plurality of word conductors $w_1$, $w_2$, $w_3$, and $w_4$, both ends of which are connected to a word pulse source 16, is threaded between the posts bearing the corresponding first subscript. Thus, for example, conductor $w_1$ threads the posts of the uppermost row, and conductor $w_4$ threads the posts of the lowermost row as viewed in FIG. 1. For clarity, the path of only word conductor $w_1$ is shown; only the connections between the remaining word conductors and the pulse source 16 are shown. Specifically, word conductor $w_1$ threads, in an alternating sense, between the posts $12_{11}$ and $12_{12}$, $12_{13}$ and $12_{14}$, $12_{15}$ and $12_{16}$, about post $12_{17}$, between posts $12_{17}$ and $12_{16}$, $12_{15}$ and $12_{14}$ and $12_{12}$ in sequence, returning to word pulse source 16. The other word conductors follow corresponding paths (not shown) through the row of posts bearing like subscripts.

Each of a plurality of digit conductors $d_1$, $d_2$, and $d_3$, connected to a digit pulse source 17, threads, in a first sense, between an even-numbered column of cores and the next lower order, odd-numbered column, and in a second sense between that even-numbered column and the next higher order odd-numbered column. Thus, for example, digit conductor $d_1$ threads between the first and second columns of posts in one sense and between the second and third columns in the opposite sense. The digit conductors $d_1$, $d_2$, and $d_3$ also are connected to a utilization circuit 18 by means of conductors $u_1$, $u_2$, and $u_3$, respectively, suitable isolation (not shown) being provided therebetween. Pulse sources 16 and 17, and utilization circuit 18, are connected to a control circuit 19 via conductors 20, 21, and 22, respectively.

Accordingly, the memory plane is organized into four information words, three bit locations each. Each bit location includes two "cores" per bit, each of the cores of the third and fifth columns being common to two bit locations. Each word conductor threads in the same sense both "cores" of each bit location in a row. Each digit conductor threads in opposing sense the two "cores" of each bit in a column.

The operation of the memory of FIG. 1 will be described in terms of an assumed illustrative word 101 stored in the three bit locations of the first row of FIG. 1. Since each bit location, in accordance with this invention, stores information alike, the writing and reading of both a binary "1" and a binary "0" will first be described in connection with a representative bit location. Then this storing and reading of information will be extended in accordance with the assumed illustrative operation. It is assumed that the representative bit location as shown in FIG. 2 is, initially, in a read state wherein the flux in the flux paths 14 and 15 thereof is directed counterclockwise. This state is shown as row 3 in FIG. 5 and is discussed in detail hereinafter.

Specifically, a binary "1" is stored in an illustrative bit location, for example, $BL_{11}$, by applying a positive "write" pulse to word conductor $w_1$, and, coincidently, a positive "digit" pulse to digit conductor $d_1$. In this connection, a positive pulse is one in which current flows in a direction from the source. Since, in the described embodiments, both ends of each conductor are connected to a pulse source, the polarity designations are taken with respect to the end of the conductor with which that conductor designation is associated. These pulses are applied by word pulse source 16 and digit pulse source 17, respectively, under the control of control circuit 19. In this connection, pulse sources 16 and 17 may be any pulse sources capable of supplying pulses in accordance with this invention. Similarly, control circuit 19 may be any control circuit capable of controlling the pulse sources and the utilization circuit in accordance with this invention.

In response to these two positive pulses, the flux in flux path 14 is driven in a clockwise direction directing to the right the flux in the plate 13 as viewed in FIG. 2. This result is produced because the word pulse and the digit pulses add to provide a resultant magnetic field thereabout which far exceeds the switching threshold for path 14 as shown in FIG. 3.

FIG. 3 illustrates an idealized hysteresis curve for the flux path 14 as has been stated hereinbefore. The switching threshold is designated $mmf_c$ and the write pulse is represented therein by an arrow indicating an amplitude less than the switching threshold, that is, illustratively, insufficient in and of itself to cause flux switching there.

The write and digit pulses couple path 15 in opposing senses. Consequently, the flux in path 15 remains directed in the counterclockwise condition, the write pulse less the digit pulse producing a resultant magnetic field insufficient to exceed the switching threshold $mmf_c$ for that flux path as shown in FIG. 4. It is noted that the write pulse shown, in connection with the idealized hysteresis curve for flux path 15, exceeds the switching threshold there.

A binary zero is stored in the illustrative bit location $BL_{11}$ by applying a positive write pulse to word conductor $w_1$ in the absence of a coincident digit pulse in digit conductor $d_1$. Such a positive pulse is applied by word conductor $w_1$ under the control of word pulse source 16. In response to this positive pulse, flux in flux path 15 switches from the counterclockwise condition to the clockwise condition or, in other words, from left to right in the plate 13 between posts $12_{12}$ and $12_{13}$ as shown in row 2 of FIG. 6. The write pulse is, illustratively, insufficient to switch flux in flux path 14. Accordingly, the flux there remains in the counterclockwise direction.

A binary "1" is read out of the illustrative bit location $BL_{11}$ by a negative, high amplitude read pulse in word conductor $w_1$. This pulse is provided by word pulse source 16 under the control of control circuit 19. A negative pulse in conductor $w_1$ drives the flux in flux paths 14 and 15 counterclockwise or, in other words, to the left in plate 13 there. These directions are represented by the arrows in row 3 of FIG. 6 and are consistent with the read state to which all locations are initially switched. For a binary "1," the flux in flux path 14 is directed clockwise and is reversed by the read pulse. The flux path 15, in a bit location storing a "1," is already directed counterclockwise and experiences only insignificant flux shuttling in response to the read pulse. The switching flux in path 14 induces a positive pulse in the digit conductor $d_1$ which is conducted via conductor $u_1$ to utilization circuit 18.

A binary "0" is read out of the representative bit location $BL_{11}$ also by a negative read pulse on the word conductor $w_1$ as described above. In response thereto, the flux in flux path 15 thereof switches from the clockwise to the counterclockwise direction; the flux in flux path 14 thereof already is directed in the counterclockwise direction and experiences only insignificant flux shuttling in response to the read pulse. The switching flux produces a negative pulse in digit conductor $d_1$ which is conducted to utilization circuit 18 via conductor $u_1$.

It is to be understood that the amplitude of the write pulse has been selected arbitrarily to illustrate the conditions under which problems exist in accordance with prior art operation. Actually, high or low amplitude write pulses may be used in accordance with this invention. In this connection, high amplitude pulses are pulses of sufficient amplitude to insure flux reversal in both flux paths 14 and 15 of a selected bit location. A low amplitude pulse is one which avoids flux reversal in both of these flux paths. In the first instance, in response to a read-out pulse reversing flux in both flux paths 14 and 15 of a selected bit location, opposing pulses are induced in the digit conductor and only an insignificant output pulse is detected by the utilization circuit. In the second instance, the flux in each of flux paths 14 and 15 is already in the counterclockwise condition and experiences only insignificant flux shuttling in response to a read pulse. The utilization circuit detects only a negligible pulse in response thereto.

The foregoing description of the storing of binary values in a representative bit location in accordance with this invention will now be extended in accordance with the assumed illustrative operation of storing the word 101 in the bit locations $BL_{11}$, $BL_{12}$, and $BL_{13}$, and, subsequently, reading it out. Initially, the flux in each bit location is driven into the pattern shown in row 3 of FIG. 6 in the manner described. Subsequently, the word 101 is stored in the designated locations by applying a positive write pulse to the word conductor $w_1$ and applying, coincidently, positive digit pulses to digit conductors $d_1$ and $d_3$ in the manner already described. No pulse is applied to the digit conductor $d_2$ at this time. In response to these pulses, the flux in bit locations $BL_{11}$ and $BL_{13}$ is driven to the pattern shown in row 1 of FIG. 6. The flux in bit location $BL_{12}$ is driven to the pattern shown in row 2 of FIG. 6. In response to a subsequent negative read pulse, applied in a manner already described, flux in bit locations $BL_{11}$ and $BL_{13}$ switches from the pattern shown in row 1 of FIG. 6 to that shown in row 3; the flux in bit location $BL_{12}$ switches from the pattern shown in row 2 of FIG. 6 to that shown in row 3. In response to this flux switching, positive pulses are induced in digit conductors $d_1$ and $d_3$ and conducted to utilization circuit 18 via conductors $u_1$ and $u_3$. A negative pulse is induced in digit conductor $d_2$ at this same time. This negative pulse is conducted to utilization circuit 18 via conductor $u_2$. In this connection, utilization circuit 18 may be any utilization circuit capable of utilizing a parallel output in accordance with this invention.

In word-organized memories, it is important that operations on a selected bit location do not disturb the information in corresponding bit locations of nonselected words. Such disturbing effects are avoided herein by limiting the amplitude of digit pulses to values less than the switching threshold of any bit location in the memory.

What has been described is considered to be only an illustrative embodiment according to the principles of this invention, and it is to be understood that numerous other arrangements may be devised by one skilled in the art without departing from the spirt and scope thereof.

What is claimed is:

1. In a magnetic memory circuit, the combination comprising a low reluctance member including a plurality of posts thereon and a magnetic sheet of a material having substantially rectangular hysteresis characteristic juxtaposed with said posts, said posts being arranged generally in rows and columns, each even-numbered column of posts being spaced apart unequal distances from the odd-numbered column of posts immediately adjacent to it, said posts being organized into groups of three for defining a bit location, each group defining in said sheet first and second independent flux paths of unequal length through said overlay, first means coupled to said first and second flux paths for driving flux in a like direction in each simultaneously for establishing a first magnetic condition when pulsed, second means coupled to said first and second flux paths for driving flux in opposite directions simultaneously for establishing a second magnetic condition when pulsed, third means also coupled to said first and second flux paths for driving flux in opposite directions simultaneously for establishing a third magnetic condition when pulsed.

2. A memory circuit in accordance with claim 1 including fourth means coupled to said bit location for detecting, selectively, flux switched in said bit locations from said second and third to said first condition.

3. A memory circuit in accordance with claim 2 wherein said first means includes a first conductor threaded in like senses between the first and second and the second and third posts of each of said bit locations.

4. A memory circuit in accordance with claim 3 wherein said second means includes a second conductor threaded in opposing senses between the first and second and the second and third posts of the corresponding bit locations in each of said rows.

5. A memory circuit in accordance with claim 4 wherein adjacent ones of said groups of three posts in a row have one post in common.

References Cited

UNITED STATES PATENTS

| | | | |
|---|---|---|---|
| 3,278,910 | 10/1966 | Bobeck | 340—174 |
| 3,196,417 | 7/1965 | Franks | 340—174 |

FOREIGN PATENTS

| | | |
|---|---|---|
| 221,062 | 1/1957 | Australia. |

BERNARD KONICK, *Primary Examiner.*

V. P. CANNEY, *Assistant Examiner.*